United States Patent
Hirata

(10) Patent No.: US 7,704,065 B2
(45) Date of Patent: Apr. 27, 2010

(54) INJECTION STRETCH BLOW MOLDING APPARATUS

(75) Inventor: Hisakazu Hirata, Ueda (JP)

(73) Assignee: Nissei ASB Machine Co., Ltd., Komoro-shi (JP)

( * ) Notice: Subject to any disclaimer, the term of this patent is extended or adjusted under 35 U.S.C. 154(b) by 86 days.

(21) Appl. No.: 12/022,395

(22) Filed: Jan. 30, 2008

(65) Prior Publication Data

US 2008/0131551 A1    Jun. 5, 2008

Related U.S. Application Data

(63) Continuation of application No. PCT/JP2007/057819, filed on Apr. 9, 2007.

(30) Foreign Application Priority Data

Apr. 10, 2006 (JP) ............................. 2006-107107

(51) Int. Cl.
  *B29C 49/36* (2006.01)
  *B29C 49/56* (2006.01)
(52) U.S. Cl. .................. 425/190; 425/529; 425/540; 425/541; 425/451.6
(58) Field of Classification Search ................. 425/190, 425/529, 540, 541, 451.6
  See application file for complete search history.

(56) References Cited

U.S. PATENT DOCUMENTS 5,843,496 A * 12/1998 Ito et al. ................ 425/589
5,851,699 A    12/1998 Matsubayashi et al.
6,050,804 A *  4/2000 Tamaki et al. ............ 425/190
6,527,536 B2 * 3/2003 Okubo et al. ............ 425/190
6,752,619 B2 * 6/2004 Lai et al. ................. 425/451.6

FOREIGN PATENT DOCUMENTS

| JP | 10-151667 A1 | 6/1998 |
| JP | 11-286043 A1 | 10/1999 |
| JP | 2000-000882 A1 | 1/2000 |
| JP | 3195254 B2 | 6/2001 |
| JP | 2005-131818 A1 | 5/2005 |
| JP | 3722671 B2 | 11/2005 |

* cited by examiner

*Primary Examiner*—Robert B Davis
(74) *Attorney, Agent, or Firm*—Burr & Brown

(57) ABSTRACT

An injection stretch blow molding apparatus includes a lower base which is secured on a stage, an upper base which is disposed above the lower base and supports a turntable, and vertical clamping device that raises and lowers the upper base with respect to the lower base. The vertical clamping device includes a pulling plate disposed in the stage under the lower base, a plurality of tie rods which pass through the lower base and connect the upper base and the pulling plate, a vertical clamping toggle mechanism which is disposed in the stage at a position under the injection molding section and expands and contracts with respect to the lower base as a reference position to raise and lower the pulling plate, and a first motor which transmits a driving force to the vertical clamping toggle mechanism.

10 Claims, 14 Drawing Sheets

INJECTION STRETCH BLOW MOLDING APPARATUS

CROSS REFERENCE TO RELATED APPLICATION

This application is a continuation of International Patent Application No. PCT/JP2007/57819, having an international filing date of Apr. 9, 2007, which designated the United States, the entirety of which is incorporated herein by reference Japanese Patent Application No. 2006-107107 filed on Apr. 10, 2006 is also incorporated herein by reference in its entirety.

BACKGROUND OF THE INVENTION

The present invention relates to an injection stretch blow molding apparatus In particular, the invention relates to an injection stretch blow molding apparatus in which neck molds are intermittently transferred to at least an injection molding section and a stretch blow molding section using a turntable.

In this type of injection stretch blow molding apparatus, a motor is used to drive a turntable, and a hydraulic driving system is used for a driving section (e.g. clamping section) which requires a relatively large driving force. For example, Japanese Patent No. 3722671 utilizes a hydraulic cylinder for vertical clamping of a neck mold attached to a turntable, horizontal clamping of blow cavity split molds, and the like. It is known in the art that an injection molding apparatus which is different from an injection stretch blow molding apparatus and does not perform blow molding utilizes a toggle mechanism which is expanded and contracted using a motor as a vertical clamping mechanism (Japanese Patent No. 3195254 and JP-A-2005-131818).

SUMMARY

According to one aspect of the invention, there is provided an injection stretch blow molding apparatus which includes at least an injection molding section and a stretch blow molding section and includes a turntable which intermittently transfers neck molds disposed corresponding to the respective molding sections to the respective molding sections, the injection stretch blow molding apparatus preferably includes:

a lower base which is secured on a stage and forms a molding space of each of the molding sections between the lower base and the turntable;

an upper base which is disposed above the lower base and supports the turntable; and vertical clamping device that raises and lowers the upper base with respect to the lower base;

wherein the vertical clamping device includes:

a pulling plate disposed in the stage under the lower base;

a plurality of tie rods which pass through the lower base and connect the upper base with the pulling plate;

a vertical clamping toggle mechanism which is disposed in the stage at a position under the injection molding section and is expanded and contracted with respect to the lower base as a reference position to raise and lower the pulling plate; and a first motor which transmits a driving force to the vertical clamping toggle mechanism;

wherein the vertical clamping toggle mechanism includes:

a pair of driving arms driven by the first motor;

a pair of first driven arms of which one end is pin-connected to the pair of driving arms and the other end is pin-connected to the lower base; and a pair of second driven arms of which one end is pin-connected to the pair of driving arms and the other end is pin-connected to the pulling plate; and wherein the first and second driven arms respectively pin-connected to the pair of driving arms extend linearly during clamping.

DETAILED DESCRIPTION OF THE INVENTION

Figure 1:
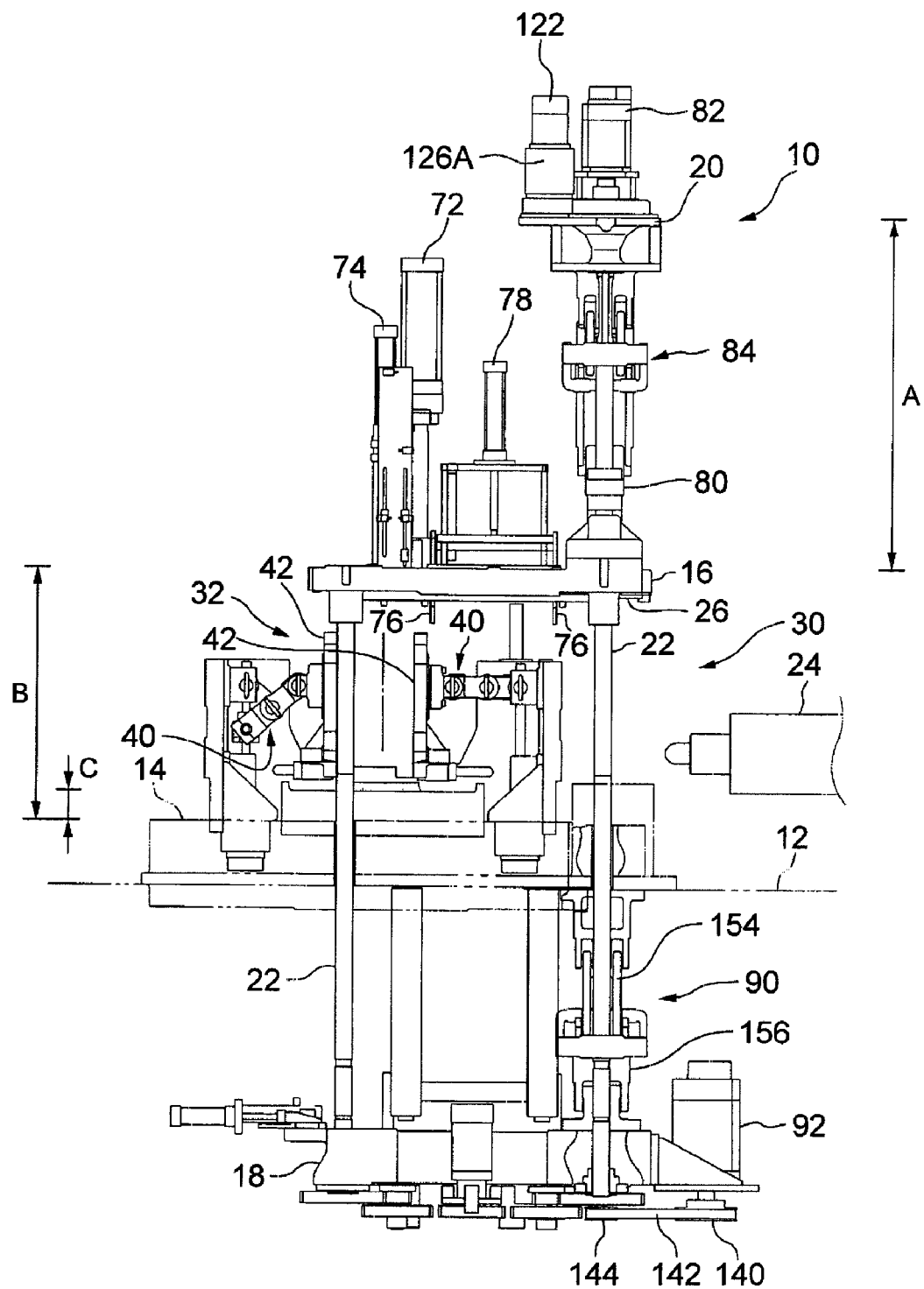
FIG. 1 is side view of an injection stretch blow molding apparatus according to one embodiment of the invention.

Studies have been made to electrically drive an injection stretch blow molding apparatus instead of using a hydraulic driving system from the viewpoint of noise and cleanliness.

Accordingly, the invention preferably provides an injection stretch blow molding apparatus that can electrically achieve vertical clamping requiring a large driving force while also electrically driving other clamping mechanisms and position adjustment mechanisms.

According to one embodiment of the invention, there is provided an injection stretch blow molding apparatus that includes at least an injection molding section and a stretch blow molding section and includes a turntable which intermittently transfers neck molds disposed corresponding to the respective molding sections to the respective molding sections, the injection stretch blow molding apparatus preferably includes:

a lower base which is secured on a stage and forms a molding space of each of the molding sections between the lower base and the turntable;

an upper base which is disposed above the lower base and supports the turntable; and vertical clamping device that raises and lowers the upper base with respect to the lower base;

wherein the vertical clamping device includes:

a pulling plate disposed in the stage under the lower base;

a plurality of tie rods which pass through the lower base and connect the upper base with the pulling plate;

a vertical clamping toggle mechanism which is disposed in the stage at a position under the injection molding section and is expanded and contracted with respect to the lower base as a reference position to raise and lower the pulling plate; and a first motor which transmits a driving force to the vertical clamping toggle mechanism.

According to the invention, the vertical clamping toggle mechanism expanded by the first motor with respect to the lower base lowers the pulling plate, and the tie rods and the upper base are lowered together with the pulling plate. This enables the neck mold to be vertically clamped together with the turntable supported by the upper base, while also enabling an injection molding operation in the injection molding section along with a blow molding operation in the stretch blow molding section. The vertical clamping toggle mechanism contracted with respect to the lower base raises the pulling plate, and the tie rods and the upper base are raised together with the pulling plate. As a result, the neck mold can be opened together with the turntable supported by the upper base. This enables the molded product to be transferred to the next step. As described above, since the upper base is vertically clamped through the tie rods by being pulled by the pulling plate in the support, a large vertical clamping mechanism need not be disposed above the upper base. In particular, since the vertical clamping toggle mechanism is displaced in the stage at a position under the injection molding section, the space at the center of the stage can be provided as space for other mechanisms.

In the invention, the vertical clamping toggle mechanism may include a pair of driving arms driven by the first motor, a pair of first driven arms of which one end is pin-connected to the pair of driving arms and the other end is pin-connected to the lower base, and a pair of second driven arms of which one end is pin-connected to the pair of driving arms and the other end is pin-connected to the pulling plate. The first and second driven arms respectively pin-connected to the pair of driving arms extend linearly during clamping to ensure a clamping force.

In the injection stretch blow molding apparatus, when one of the upper base and the pulling plate is a movable section and one of the lower base and the stage is a stationary section, the stretch blow molding section may be provided with restriction device that restricts a height position of the upper base above the stretch blow molding section by maintaining the distance between the movable section and the stationary section constant when clamped by the vertical clamping device.

When the vertical clamping device is eccentrically disposed toward the injection molding section, vertical clamping in the stretch blow molding section must be performed using the clamping force by the tie rods. Since the stretch blow molding section is not vertically clamped directly, the upper base may rise due to the reaction force of the eccentric driving force of vertical clamping, the blow air pressure, and the like. Therefore, the restriction device maintains that the distance between the movable section and the stationary section remains constant during vertical clamping and the upper base is prevented from rising.

In the injection stretch blow molding apparatus, the restriction device may include:

a shaft section suspended from the stationary section;

a wedge-shaped member which is inserted into and removed from a space between the lower end of the shaft section and the pulling plate; and a driving section which drives the wedge-shaped member.

Since the distance between the pulling plate and the stationary section is fixed by inserting the wedge-shaped member between the lower end of the shaft section and the pulling plate, the upper base can be prevented from rising during vertical clamping.

In the injection stretch blow molding apparatus, horizontal synchronization device that horizontally moves the pulling plate may be disposed in the stage; and the horizontal synchronization device may include:

a plurality of racks suspended from the lower base on the injection molding section side and the stretch blow molding section side; and a plurality of pinions which are supported by a shaft disposed over the pulling plate between the injection molding section and the stretch blow molding section and respectively engage with the racks.

According to this feature, even if the mold is closed, vertically clamped, or opened at a position displaced toward the injection molding section, the pulling plate is raised and lowered horizontally by the pinion gears which respectively engage the racks.

In the invention, clamping mechanisms other than the vertical clamping mechanism and the position adjustment mechanism requiring a relatively large driving force can be electrically driven. In the injection stretch blow molding apparatus, a motor securing plate to which a second motor which clamps an injection core mold is attached may be disposed above the upper base; an injection core clamping toggle mechanism may be provided which is expanded and contracted by the second motor with respect to the motor securing plate as a reference position to clamp the injection core mold; and the motor securing plate, the upper base, and the pulling plate is capable to be raised and lowered together with the tie rods.

This enables the distance between the motor securing plate and the upper base which are integrally raised and lowered to be maintained constant, whereby the injection core clamping stroke can be minimized.

The injection stretch blow molding apparatus may further comprise an injection core clamping position adjustment mechanism which adjusts a clamping position of the injection core mold by adjusting a height position of the motor securing plate with respect to the upper base.

In the injection stretch blow molding apparatus, the upper ends of two of the tie rods disposed in the injection molding section may be supported by the motor securing plate, and two first threaded portions may be formed at the upper ends of the two tie rods;

the injection core clamping position adjustment mechanism may include:

a third motor which is supported by the motor securing plate and generates a rotation output from each end of a horizontal rotary shaft;

two bevel gearboxes which orthogonally transform the rotation output from each end of the horizontal rotary shaft; and a first position change section which changes a first support height position at which the motor securing plate is supported by the two tie rods; and the first position change section may include:

two first nut sections which are rotatably supported by the motor securing plate and into which the two first threaded portions are screwed; and two second gears which are respectively secured on the two first nut sections and to which rotational forces of two first gears are transmitted.

The rotation output from the third motor is transmitted to the two first nut sections through the two bevel gearboxes, the two first gears, and the two second gears, whereby the first nut section is rotated by the same amount in the same direction. This causes the two tie rods having the first threaded portions engaging with the two first nut sections to move in the axial direction so that the first support height position at which the motor securing plate is supported by the two tie rods is changed. Therefore, the position of the injection core mold supported by the motor securing plate is changed, whereby the clamping position of the injection core mold can be adjusted.

The injection stretch blow molding apparatus may further include a mold thickness adjustment mechanism which changes the height of the molding space between the lower base and the upper base to correspond to the thickness of a mold disposed in the molding space.

This enables adjustment of the heights of the molding spaces of the injection molding section and the stretch blow molding section, whereby the height of the molding space can be adjusted to a height suitable for the height of the injection mold or the blow mold designed depending on the size of molded product.

In the injection stretch blow molding apparatus,
the mold thickness adjustment mechanism may include:
a fourth motor;
a third gear rotated by the fourth motor;
a large-diameter fourth gear which can be rotated around a position at an equal distance from the tie rods as a center of rotation and engages with the third gear;
a plurality of second threaded portions respectively formed at lower ends of the tie rods; and
a second position change section which changes a second support height position at which the pulling plate is supported by the tie rods; and
the second position change section may include:
a plurality of second nut sections which are rotatably supported by the pulling plate and respectively engage the second threaded portions; and
a plurality of fifth gears which are respectively secured on the second nut sections and to which a rotational force of the fourth gear is transmitted.

The rotation output from the fourth motor is transmitted to the second nut sections through the third gear, the fourth gear, and the fifth gears. Therefore, the second nut sections are rotated by the same amount in the same direction. This causes the tie rods having the second threaded portions engaging with the second nut sections to move in the axial direction, whereby the second support height position at which the pulling plate is supported by the tie rods is changed. Therefore, the height position of the upper base connected to the pulling plate through the tie rods is changed, whereby the height of the molding space between the lower basic and the upper base can be adjusted.

The injection stretch blow molding apparatus may further comprise:
a blow unit base which is disposed in the stretch blow molding section, which is raised and lowered with respect to the lower base, and on which horizontal clamping device for two blow cavity split molds clamped against the neck mold is provided; and
a blow unit position adjustment mechanism which raises and lowers the blow unit base to adjust a height position.

This allows the blow unit base disposed in the stretch blow molding section to be raised and lowered by the blow unit position adjustment mechanism so that the height position is changed. Since the blow unit base is provided with the horizontal clamping mechanism for two blow cavity split molds clamped against the neck mold held by the turntable, the height of the blow molding space defined by the blow unit base and the upper base can be changed independently of the height of the molding space between the lower base and the upper base. Therefore, the height of the blow cavity split molds can be designed independently of the injection mold, whereby the degrees of freedom of the design are increased.

In the injection stretch blow molding apparatus,
the blow unit position adjustment mechanism may include:
a fifth motor supported by the lower base;
a sixth gear rotated by the fifth motor;
a third threaded portion which is connected to the blow unit base and is disposed on a centerline of the two blow cavity split molds; and
a third position change section which changes a third support height position at which the blow unit base is supported by the lower base; and
the third position change section may include:
a third nut section which is rotatably supported by the lower base and engages with the third threaded portion; and
a seventh gear which secured on the third nut section and to which a rotation output of the sixth gear is transmitted.

The rotation output from the fifth motor is transmitted to the third nut sections through the sixth gear and the seventh gear. This causes the blow unit base having the third threaded portion engaging with the third nut section to be raised and lowered with respect to the lower base so that the height position can be changed.

Preferred embodiments of the invention are described below in detail. Note that the embodiments described below do not in any way limit the scope of the invention defined by the claims laid out herein. Note that all elements of the embodiments described below should not necessarily be taken as essential requirements for the invention.

(Outline of Entire Apparatus)

Figure 2:
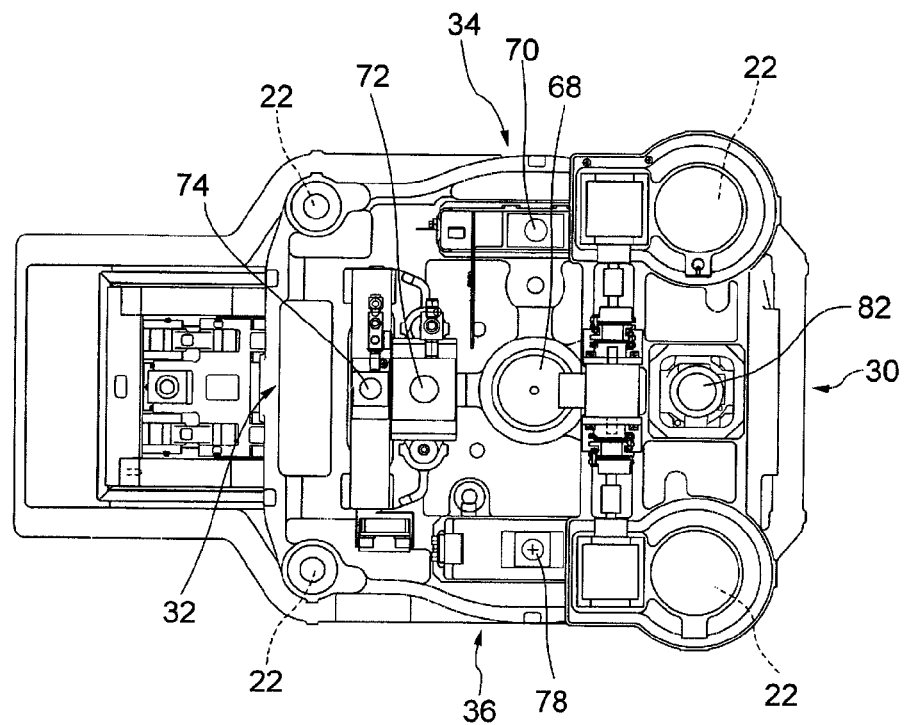
FIG. 2 is a plan view of the injection stretch blow molding apparatus shown in FIG. 1.

FIGS. 1 and 2 respectively provide a side view and a plan view showing an injection stretch blow molding apparatus according to one embodiment of the invention. Note that all molds are omitted in FIG. 1. A neck mold, an injection core mold, an injection cavity mold, a hot runner mold, a temperature control pot, a blow core mold, a blow cavity mold, and the like according to this embodiment are the same as those of Japanese Patent No. 3722671 except for the driving method. Specifically, the hydraulic driving system employed in Japanese Patent No. 3722671 is replaced with a motor and a toggle mechanism in this embodiment. Accordingly, the injection stretch blow molding apparatus according to this embodiment is driven by a motor and an air cylinder (hereinafter abbreviated as "cylinder").

As shown in FIGS. 1 and 2, an injection stretch blow molding apparatus 10 includes a stage 12, a lower base 14, an upper base 16, a pulling plate 18, and a motor securing plate 20. The upper base 16, the pulling plate 18, and the motor securing plate 20 are connected and secured by a plurality of (e.g. four) tie rods 22 (only two tie rod positions are shown in FIG. 1) passing through the lower base 14.

The stage 12 is in the shape of a hollow box. An injection device 24 is attached to one side of the upper surface of the stage 12. The lower base 14 is secured on the other side of the upper surface of the stage 12.

The upper base 16 is disposed above the lower base 14 at a specific interval from the lower base 14, and rotatably supports a turntable 26 on the lower side.

The upper base 16 is connected to and secured at the intermediate positions of two tie rods 22 on the side of the injection device 24 and the upper ends of two tie rods 22 on the side opposite to the injection device 24.

The space between the lower base 14 and the turntable 26 is used as a molding space. As shown in FIG. 2, an injection molding section 30 is provided on the side of the injection device 24, a stretch blow molding section 32 is provided at a position opposite to the injection molding section 30, and a temperature control section 34 and a removal section 36 are provided at positions on a line perpendicularly intersecting a line connecting the injection molding section 30 and the stretch blow molding section 32.

In the injection molding section 30, an injection cavity mold is attached to the lower base 14 through a hot runner mold which is always in contact with the injection device 24 via a nozzle during operation (not shown in FIG. 1).

In the stretch blow molding section 32, two blow cavity split molds (see symbols 294A and 294B in FIG. 18) are attached to two clamping plates 42 which are opened/closed and clamped by two clamping toggle mechanisms 40, and a blow bottom mold (see symbol 296 in FIG. 18) is disposed, if necessary.

In the temperature control section 34, a temperature control pot (not shown) is secured on the lower base 14. A temperature control core may be disposed on the upper base so that the temperature control core can be raised and lowered, if necessary.

Figure 3:
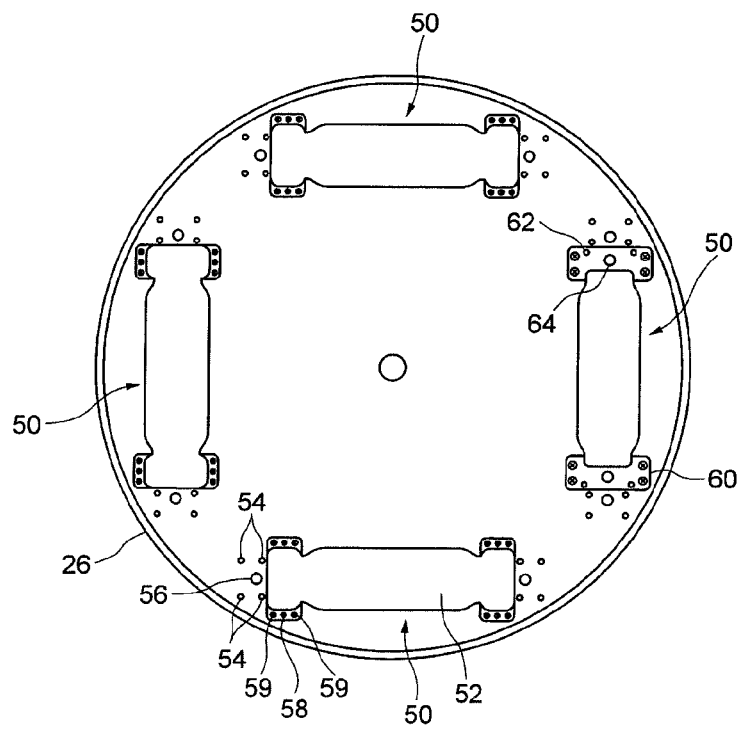
FIG. 3 is a plan view of a turntable.

FIG. 3 is a plan view of the turntable 26. Neck mold securing plate mounting sections 50 are provided to the turntable 26 at four locations corresponding to the injection molding section 30, the temperature control section 34, the stretch blow molding section 32, and the removal section 36. A hole 52 is formed in each mounting section 50. Two neck mold securing plates of different sizes can be attached to the hole 52. A large neck mold securing plate is mounted using four threaded holes 54 and one guide pin hole 56 provided on each side of the hole 52 in the longitudinal direction. A small neck mold securing plate is secured through two auxiliary piece plates 60 shown only for the right mounting section 50 in FIG. 3. In order to attach the auxiliary piece plate 60 on each side of the hole 52 in the longitudinal direction, two threaded holes 59 are formed on either side of one guide pin hole 58. The threaded holes 59 are formed at four locations around the hole 52. A small neck mold securing plate is attached to each auxiliary piece plate 60 through one guide pin hole 64 and two threaded holes 62. For example, when the number of products simultaneously molded is large or a large blow molding pitch is employed, a large neck mold securing plate may be directly secured on the turntable 26 without using the auxiliary piece plate 60. In other cases, eight auxiliary piece plates 60 in total may be attached to the turntable 26, and a small neck mold securing plate may be attached to the turntable 26 through the auxiliary piece plates 60. Two openable/closable neck support plates are attached to the neck mold securing plate, and lip molds formed of split molds are attached to the two neck support plates.

The turntable 26 can be intermittently rotated by 90 degrees using a motor 68 (not shown) such as a servomotor provided on the upper base 16 so that the neck mold can be sequentially transferred to the injection molding section 30, the temperature control section 34, the stretch blow molding section 32, and the removal section 34. The turntable 26 may be stopped at the rotation stop position using a position adjustment mechanism (not shown) or using only a positioning device of the servomotor 68.

As shown in FIGS. 1 and 2, a temperature control core raising/lowering cylinder 70 (not shown in FIG. 1) which raises and lowers a temperature control core to the position corresponding to the temperature control section 34, a blow core raising/lowering cylinder 72 which raises and lowers a blow core mold to the position corresponding to the stretch blow molding section 32, a stretch rod raising/lowering cylinder 74 which raises and lowers a stretch rod to the position corresponding to the stretch blow molding section 32, an ejection cam raising/lowering cylinder 78 which raises and lowers an ejection cam 76 (only shown in FIG. 1) for opening the neck mold support plate to the position corresponding to the removal section 36, and the like are provided on the upper base 16.

The motor securing plate 20 is secured on the upper ends of the two tie rods 22 positioned above the upper base 16 on the side of the injection molding section 30. An injection core clamping plate 80 provided with the injection core mold is provided between the motor securing plate 20 and the upper base 16 so that the injection core clamping plate 80 can be raised and lowered along the two tie rods 22.

An injection core clamping motor 82 (second motor in a broad sense) is provided on the motor securing plate 20. An injection core clamping toggle mechanism 84, which is expanded and contracted with respect to the motor securing plate 20 by the injection core clamping motor 82, is connected to the injection core clamping plate 80.

The pulling plate 18 is connected to and secured on the lower ends of the four tie rods 22 inside the stage 12. A vertical clamping (neck clamping) toggle mechanism 90 forming a vertical clamping device is provided on the pulling plate 18 at a position under the injection molding section 30. The vertical clamping toggle mechanism 90 is expanded and contracted by a vertical clamping motor 92 (first motor in a broad sense) to raise and lower the pulling plate 18 with respect to the lower base 14.

When the vertical clamping toggle mechanism 90 is expanded by driving the vertical clamping motor 92 in a state in which the vertical clamping toggle mechanism 90 is contracted so that the pulling plate 18 is located at the upper limit position (mold open state), and the tie rods 22 are lowered by being pulled along with the downward movement of the pulling plate 18. The upper base 16 that is connected to and secured on the tie rods 22 is lowered by a first stroke so that the neck mold attached to the turntable 26 is lowered, whereby the neck mold is clamped on the injection cavity mold in the injection molding section 30, for example.

In the temperature control section 34, the neck mold is clamped to the temperature control pot. In the stretch blow molding section 32, the neck mold is set at a blow operation position, and the blow cavity split molds are clamped by a horizontal clamping toggle mechanism 40.

When the upper base 16 is lowered, the motor securing plate 20 secured on the upper ends of the two tie rods 22 on the side of the injection molding section 30 is also lowered at the same time as the upper base 16 by the first stroke.

In the injection molding section 30, the injection core clamping plate 80 is lowered by a second stroke using the toggle mechanism 84 expanded by the injection core clamping motor 82. The injection core mold and the neck mold are thus clamped. A molten resin is then injected into the injection cavity mold from the injection device 24 to form a preform.

In this case, since the motor securing plate 20 on which the injection core clamping motor 82 is secured is lowered along with the downward movement of the upper base 16, the motor securing plate 20 and the upper base 16 are always maintained at a constant distance.

Therefore, since the lowering stroke (second stroke) of the injection core clamping plate 80 can be minimized (i.e., minimum stroke from the position at which the injection core mold is removed from the turntable 26 to the clamping position), the amount of expansion/contraction of the toggle mechanism 84 can be reduced.

In the temperature control section 34, the temperature of the preform is controlled by inserting the temperature control core (not shown) into the preform placed in the temperature control pot using the temperature control core raising/lowering cylinder 70 at the same time as the molding operation of the injection molding section 30.

In the stretch blow molding section 32, the blow core mold is lowered using the blow core raising/lowering cylinder 72 and clamped on the neck mold, and the stretch rod is lowered using the stretch rod raising/lowering cylinder 74. The preform by which the temperature is controlled is biaxially stretch-blown by supplying blow air to the preform placed in the clamped blow cavity split molds to mold a bottle.

In the removal section 36, the neck mold is opened through the neck mold support plate by lowering the ejection cam 76 using the ejection cam raising/lowering cylinder 78 so that the bottle drops and is removed.

After completion of each molding step, the blow cavity split molds are opened using the horizontal clamping toggle mechanism 40, and the upper base 16 is raised using the vertical clamping toggle mechanism 90. The injection core mold, the temperature control core, the blow core mold, the stretch rod, and the ejection cam 76 are raised above the turntable 26 using the injection core clamping toggle mechanism 84, the temperature control core raising/lowering cylinder 70, the blow core raising/lowering cylinder 72, the stretch rod raising/lowering cylinder 74, and the ejection cam raising/lowering cylinder 78, whereby the turntable 26 can be rotated.

The turntable 26 is intermittently rotated in this state using the motor 68 so that the molding operation can be sequentially performed in each molding section.

(Injection Core Clamping Structure of Injection Molding Section)

Figure 4:
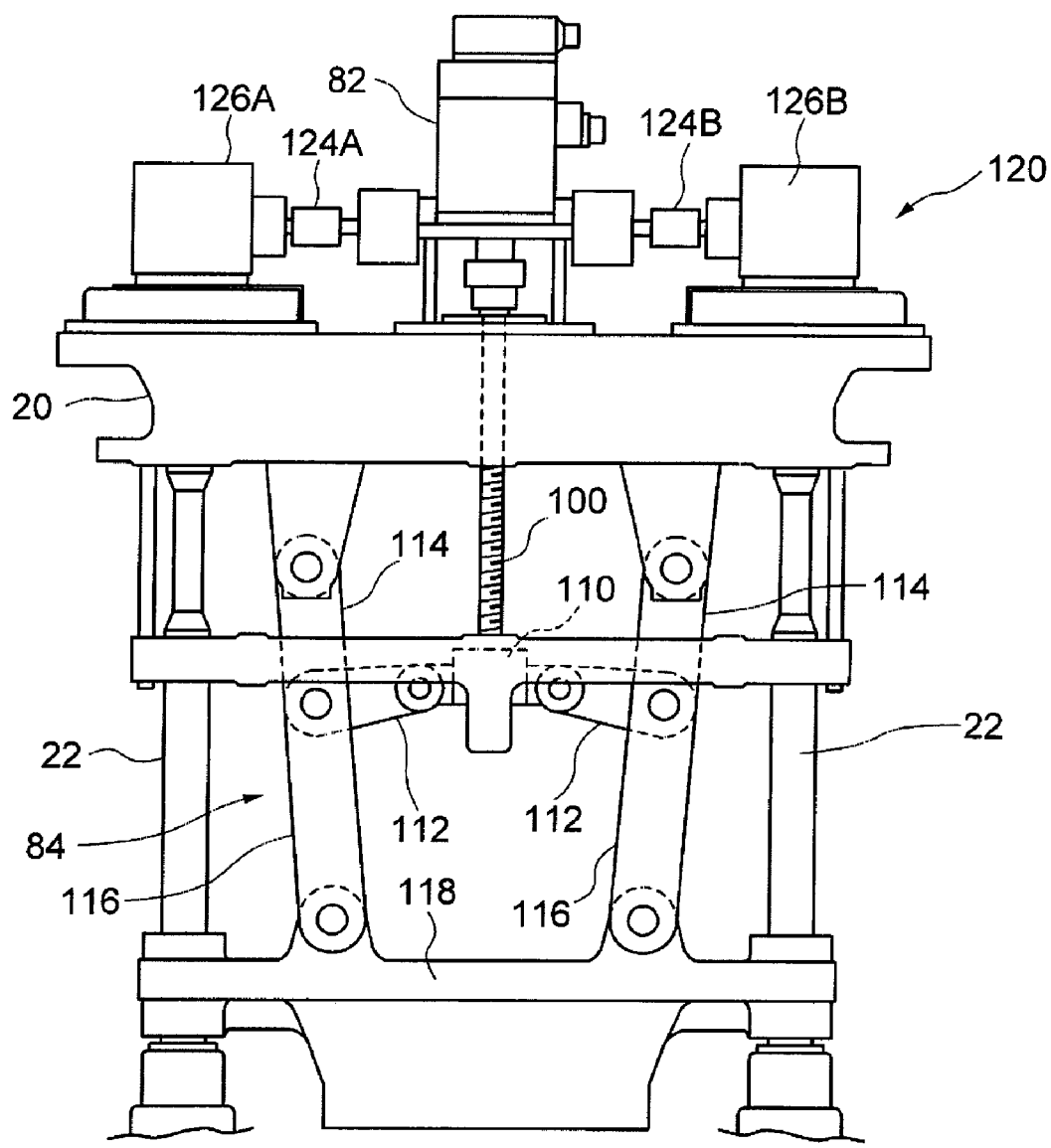
FIG. 4 is a front view showing a clamping device and a position adjustment mechanism of an injection core mold.
Figure 5:
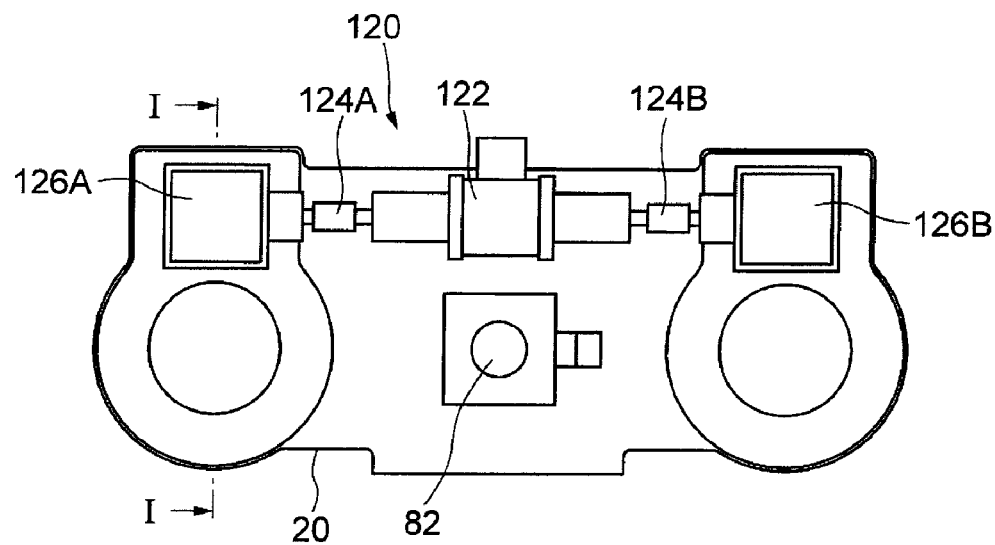
FIG. 5 is a plan view of the mechanism shown in FIG. 4.

FIG. 4 is a front view of the injection core clamping motor 82 and the injection core clamping toggle mechanism 84 shown in FIG. 1, and FIG. 5 is a plan view thereof. An injection core clamping device includes the motor 82 and the toggle mechanism 84 which is expanded and contracted by the motor 82. An injection core mold securing plate 118 (indicated by symbol 80 in FIG. 1) is raised and lowered using the toggle mechanism 84.

The rotation output shaft of the injection core clamping motor (second motor) 82 secured on the motor securing plate 20 is a screw shaft 100 suspended from the motor 82. The injection core clamping toggle mechanism 84 is expanded and contracted by the rotation of the screw shaft 100.

The injection core clamping toggle mechanism 84 includes a nut section 110 in which the screw shaft 100 is screwed, a pair of driving arms 112 of which one end is pin-connected (rotatably connected) to the nut section 110, a pair of first driven arms 114 of which one end is pin-connected to the pair of driving arms 112 and the other end is pin-connected to the motor securing plate 20, and a pair of second driven arms 116 of which one end is pin-connected to the pair of driving arms 112 and the other end is pin-connected to the injection core mold securing plate 118.

The injection core mold securing plate 118 driven by the toggle mechanism 84 is raised and lowered along the two tie rods 22. FIG. 4 shows the expanded state of the toggle mechanism 84, in which the first and second driven arms 114 and 116 extend linearly so that the injection core mold secured on the injection core mold securing plate 118 is set at the lower limit position (clamped state). When raising the nut section 110 from the clamped state shown in FIG. 4 by rotating a ball screw shaft 100, the toggle mechanism 84 is contracted so that the injection core mold secured on the injection core mold securing plate 118 is opened.

(Injection Core Clamping Position Adjustment Mechanism)

The injection core mold is clamped or opened through the injection core mold securing plate 118 in a state in which the upper base 16 is set at the clamped position by the vertical clamping devices 90 and 92. Specifically, the injection core mold is raised and lowered with respect to the upper base 16 (clamped neck mold) set at the clamped position.

The clamped position of the injection core mold is determined depending on the position of the upper surface of the injection cavity mold provided on the hot runner mold secured on the lower base 14 shown in FIG. 1. If the distance A shown in FIG. 1 (distance between the reference position of the upper base 14 and the reference position of the motor securing plate 20) is constant, the clamped position of the injection core mold is also constant.

On the other hand, there may be a case where it is desired to change the clamped position of the injection core mold by changing the distance A. Specifically, various products ranging from small containers to large containers are blow-molded using the apparatus according to this embodiment. A small preform may be used when the final container is small. If the clamped position of the injection core mold is always constant, it is necessary to increase the length of the hot runner mold in the height direction. In this case, the length of the hot runner nozzle is unnecessarily increased, and the weight of the mold is also increased.

In this embodiment, the distance B shown in FIG. 1 (distance between the reference position of the fixed lower base 14 and the reference position of the upper base 16) is changed using a mold thickness adjustment mechanism 170 (FIG. 9), as described later. In this case, the position of the upper surface of the injection cavity mold provided on the hot runner mold must be controlled within a specific range.

In this embodiment, an injection core mold position adjustment mechanism 120 is provided which changes the distance A between the reference position of the upper base 14 and the reference position of the motor securing plate 20. The injection core mold position adjustment mechanism is described below with reference to FIG. 6 showing a cross section along the line I-I in FIG. 5.

Figure 6:
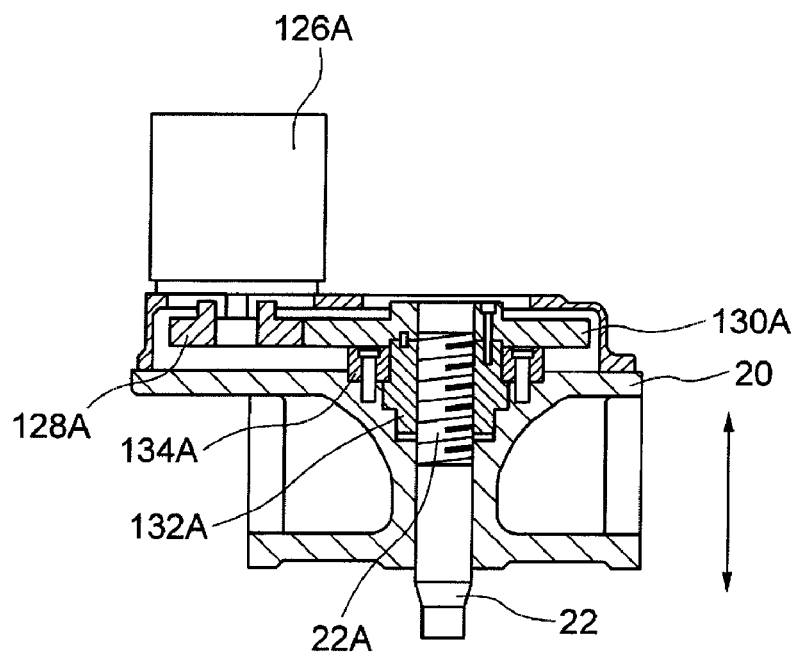
FIG. 6 is a view showing the cross section along the line I-I in FIG. 5.

As shown in FIGS. 4 to 6, the injection core mold position adjustment mechanism 120 includes a motor 122 (third motor in a broad sense), output shafts 124A and 124B which horizontally extend on either side of the motor 122, bevel gearboxes 126A and 126B which orthogonally transform the rotation input/output, gears (first gears) 128A and 128B respectively secured on the vertical output shafts of the bevel gearboxes 126A and 126B, gears (second gears) 130A and 130B which respectively engage with the gears 128A and 128B, and nut sections (first nut sections) 132A and 132B respectively secured on the gears 130A and 130B (only the gears 128A and 130A and the nut section 132A are shown in FIG. 6; the gears 128A and 130B and the nut section 132B are omitted) provided on the motor securing plate 20.

A threaded portion (first threaded portion) 22A is formed at the upper end of each of the two tie rods 22 supported by the motor securing plate 20. As shown in FIG. 6, the threaded portion 22A is screwed into the nut section 132A. In FIG. 6, the nut section 132A is rotatably supported by the motor securing plate 20, and a retaining member 134 which prevents the nut section 132A from being removed from the motor securing plate 20 is secured on the motor securing plate 20.

In the injection core mold position adjustment mechanism 120 configured as described above, the rotational force of the motor 122 is transmitted to the two gears 130A and 130B and the two nut sections 132A and 132B. The nut section 132A is rotated in the motor securing plate 20 via the retaining member 134A so that the relative position of the tie rod 22 having the screw shaft 22A screwed into the nut section 132A and the motor securing plate 20 changes. Therefore, the two gears 130A and 130B and the two nut sections 132A and 132B correspond to a position change section (first position change section) which changes a support height position (first support height position) at which the motor securing plate 20 is supported by the upper ends of the two tie rods 22.

The lower ends of the tie rods 22 are secured on the pulling plate 18, and the pulling plate 18 is held at a specific position with respect to the lower base 14 by a horizontal synchronization mechanism 160 (FIG. 8) described later. As a result, the motor securing plate 20 is raised and lowered with respect to the two tie rods 22 by the injection core mold position adjustment mechanism 120. The position of the injection core mold with respect to the upper base 16 can be adjusted by changing the distance A between the reference position of the upper base 14 and the reference position of the motor securing plate 20.

(Vertical Clamping Device)

Figure 7:
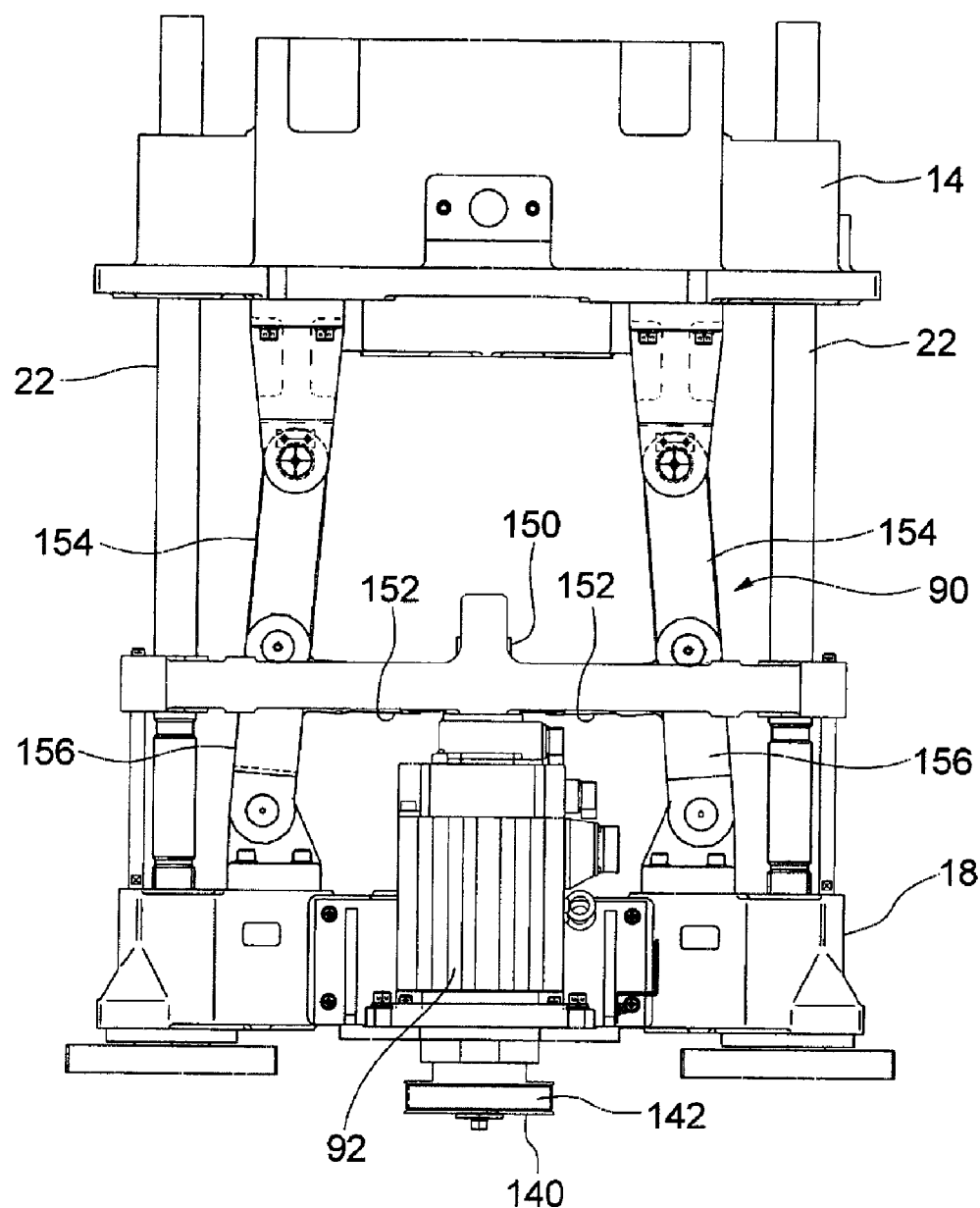
FIG. 7 is a front view of a vertical clamping device.

FIGS. 1 and 7 show the vertical clamping toggle mechanism 90 and the vertical clamping motor (first motor) 92 as the vertical clamping device. A pulley 140 is secured on the output shaft of the clamping motor 92, and the rotation output of the pulley 140 is transmitted to a pulley 144 through a timing belt 142. The pulley 144 is secured on the lower end of a ball screw shaft (not shown).

The toggle mechanism 90 is expanded and contracted by the ball screw shaft (not shown) rotated by the pulley 144. The toggle mechanism 90 basically has the same mechanism as the toggle mechanism 84 shown in FIG. 4. The toggle mechanism 90 includes a nut section 150 which is raised and lowered by the ball screw shaft (not shown), a pair of driving arms 152 of which one end is pin-connected to the nut section 150, a pair of first driven arms 154 of which one end is pin-connected to the pair of driving arms 152 and the other end is pin-connected to the lower base 14, and a pair of second driven arms 156 of which one end is pin-connected to the pair of driving arms 152 and the other end is pin-connected to the pulling plate 18.

FIG. 7 shows the expanded state of the toggle mechanism 90, in which the first and second driven arms 154 and 156 extend linearly so that the pulling plate 18 supported by the second driven arms 156 is set at the lower limit position with respect to the lower base 14. The upper base 16 connected to the pulling plate 18 through the four tie rods 22 is also set at the lower limit position with respect to the lower base 14. Therefore, the neck mold supported by the upper base 16 through the turntable 22, the neck support plate, and the like is also set at the lower limit position, whereby the neck mold is set at the clamped position with respect to the injection cavity mold and the like. When lowering the nut section 150 from the clamped state shown in FIG. 7 by the rotation output of the vertical clamping motor 92, the toggle mechanism 90 is contracted so that the pulling plate 18 and upper base 16 are set at the upper limit position with respect to the lower base 14. Therefore, the two neck cavity split molds are opened.

(Horizontal Synchronization Mechanism of Pulling Plate)

The pulling plate 18 is connected to the four tie rods 22. The vertical clamping devices 90 and 92 are disposed between the two tie rods 22 on the side of the injection molding section 30, and are driven at a position displaced from the center of the pulling plate 18. In this embodiment, the horizontal synchronization mechanism 160 is provided so that the pulling plate 18 is raised and lowered while maintaining its horizontal movement.

Figure 8:
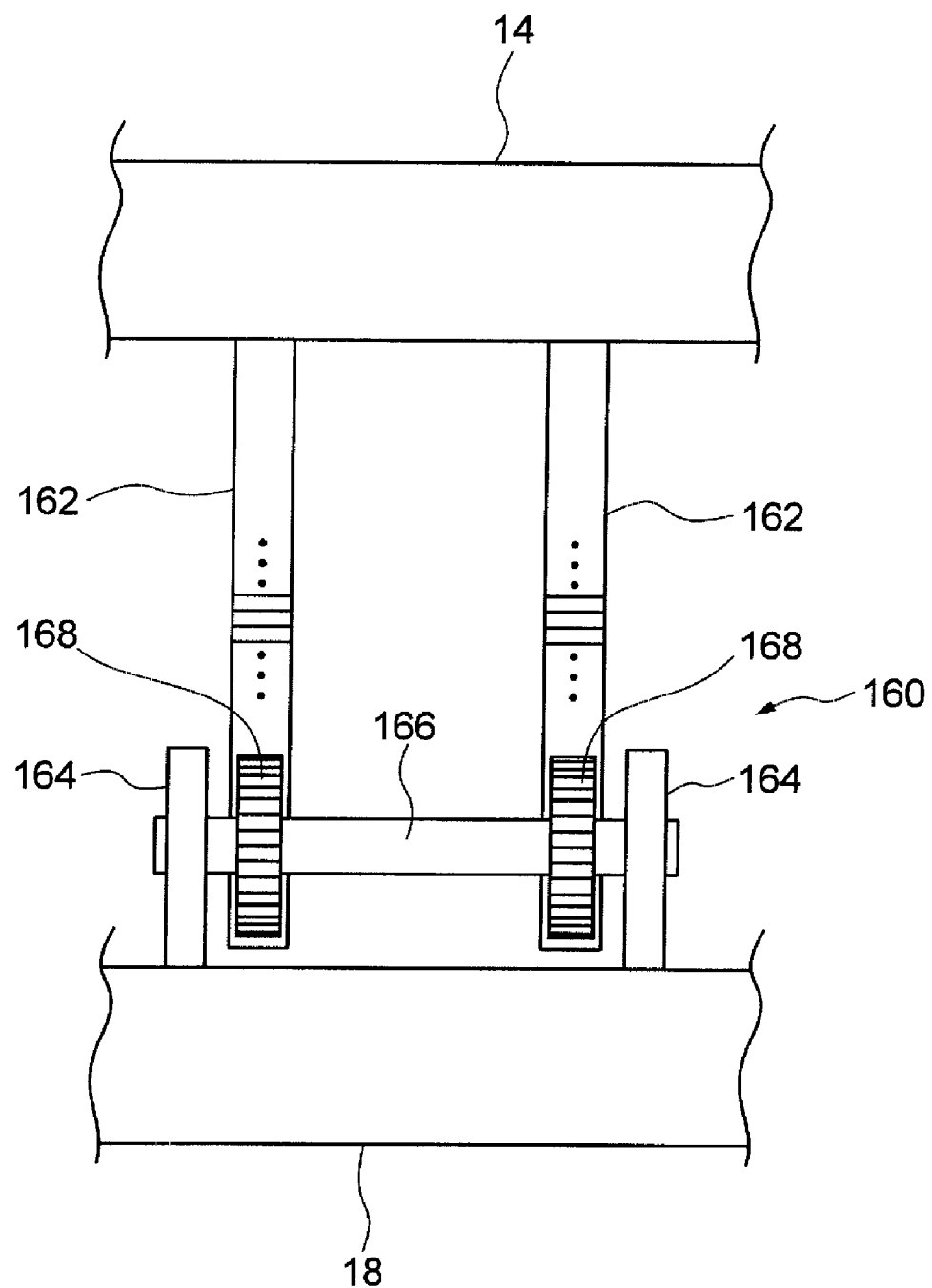
FIG. 8 is a front view showing a horizontal synchronization device of a pulling plate.

As shown in FIG. 8, the horizontal synchronization mechanism 160 includes a plurality of (e.g. two) racks 162 suspended from the lower base, mounting plates 164 secured on the pulling plate 18, a rotary shaft 166 rotatably supported by the mounting plates 162, and two pinions 168 secured on the rotary shaft 166 which engage with the two racks 162. When the pulling plate 18 is raised and lowered with respect to the lower base 14, the pinion gears 168 which engage with the racks 162 are raised and lowered at the same rack pitch, thereby ensuring the horizontal movement of the pulling plate 18. The upward/downward movement balance between the pulling plate 18 and the upper base 16 on the side of the injection molding section 30 and the side of the stretch blow molding section 32 is improved in this manner, whereby the pulling plate 18 can be smoothly raised and lowered.

(Mold Thickness Adjustment Mechanism)

Figure 9:
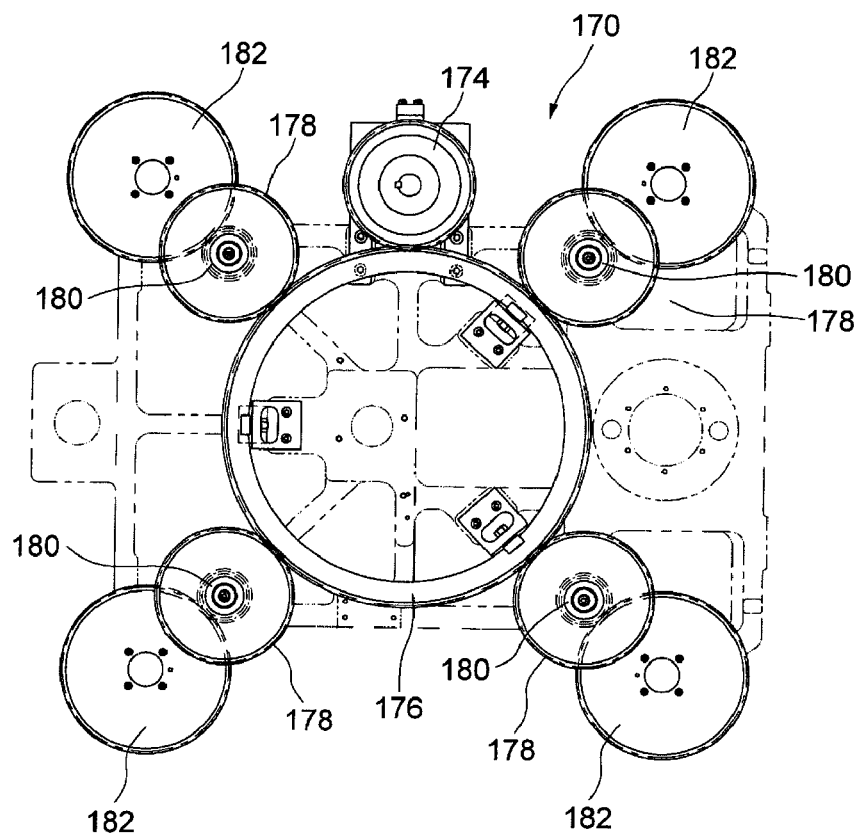
FIG. 9 is a rear view of a mold thickness adjustment mechanism.
Figure 10:
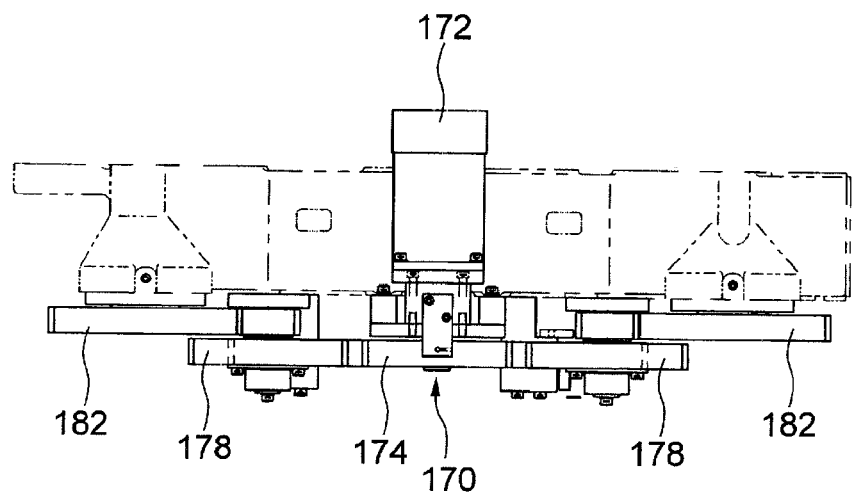
FIG. 10 is a side view of the mold thickness adjustment mechanism.
Figure 11:
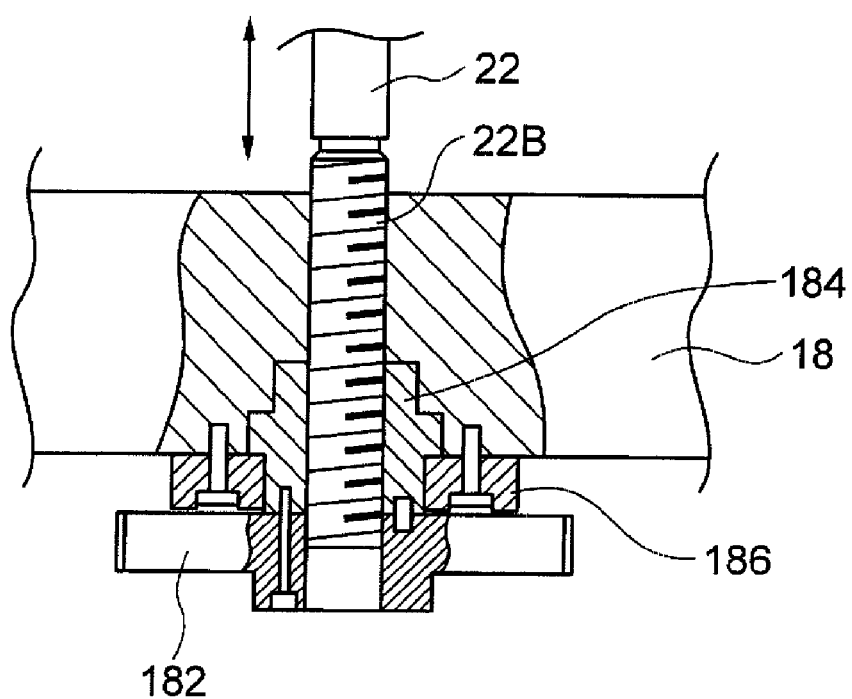
FIG. 11 is a cross-sectional view of the lower end of a tie rod.

In this embodiment, the distance B shown in FIG. 1 (distance between the reference position of the fixed lower base 14 and the reference position of the upper base 16) is changed using the mold thickness adjustment mechanism 170 shown in FIGS. 9 to 11.

As shown in FIGS. 9 and 10, the mold thickness adjustment mechanism 170 includes a mold thickness adjustment motor 172, a gear (third gear) 174 secured on the motor output shaft of the mold thickness adjustment motor 172, a large-diameter ring gear (fourth gear) 176 which engages with the gear 174, four gears 178 which respectively engage with the ring gear 176, and four gears 180 respectively secured coaxially with the four gears 178. The mold thickness adjustment mechanism 170 further includes four gears (fifth gears) 182 rotatably supported by the lower ends of the four tie bars 22. The four gears 182 respectively engage with the four gears 180. FIG. 11 shows the lower end of the tie rod 22 having substantially the same mechanism as the mechanism provided at the upper end of the tie rod 22 shown in FIG. 6. Specifically, a nut section (second nut section) 184 secured on the gear 182 disposed at the lower end of each of the four tie rods 22 is rotatably supported by the pulling plate 18 by means of a retaining member 186. A threaded portion (second threaded portion) 22B is formed on the lower end of each of the four tie rods 22. The threaded portion 22B is screwed into the nut section 184. The center of rotation of the ring gear 176 is located at an equal distance from the four tie rods 22.

In the mold thickness adjustment mechanism 170 configured as described above, the rotational force of the motor 172 is transmitted to the four gears 182 and the four nut sections 184. The four nut sections 184 are rotated in the pulling plate 18 by the retaining member 186, whereby the relative position of the tie rod 22 having the screw shaft 22B which is screwed into the nut section 184 and the pulling plate 18 changes. Therefore, the four nut sections 184 and the four gears 182 form a position change section (second position change section) which changes a support height position (second support height position) at which the lower end of the tie rod 22 is supported by the pulling plate 18.

The pulling plate 18 is held at a specific position with respect to the lower base 14 by the horizontal synchronization mechanism 160 (FIG. 8). As a result, the four tie rods 22 are raised and lowered by the mold thickness adjustment mechanism 170 with respect to the pulling plate 18. When the four tie rods 22 are raised and lowered, the upper base 16 secured on the tie rods 22 is raised and lowered with respect to the lower base 14. The height of the molding space between the lower base 14 and the upper base 16 can be changed by changing the distance B between the reference position of the lower base 14 and the reference position of the upper base 16. Therefore, the distance B can be reduced when the container to be molded is small and can be increased when the container to be molded is large, whereby the distance B can be adjusted depending on the thickness of the injection cavity mold and the blow molding cavity mold.

(Clamping Mechanism of Stretch Blow Molding Section)

Figure 12:
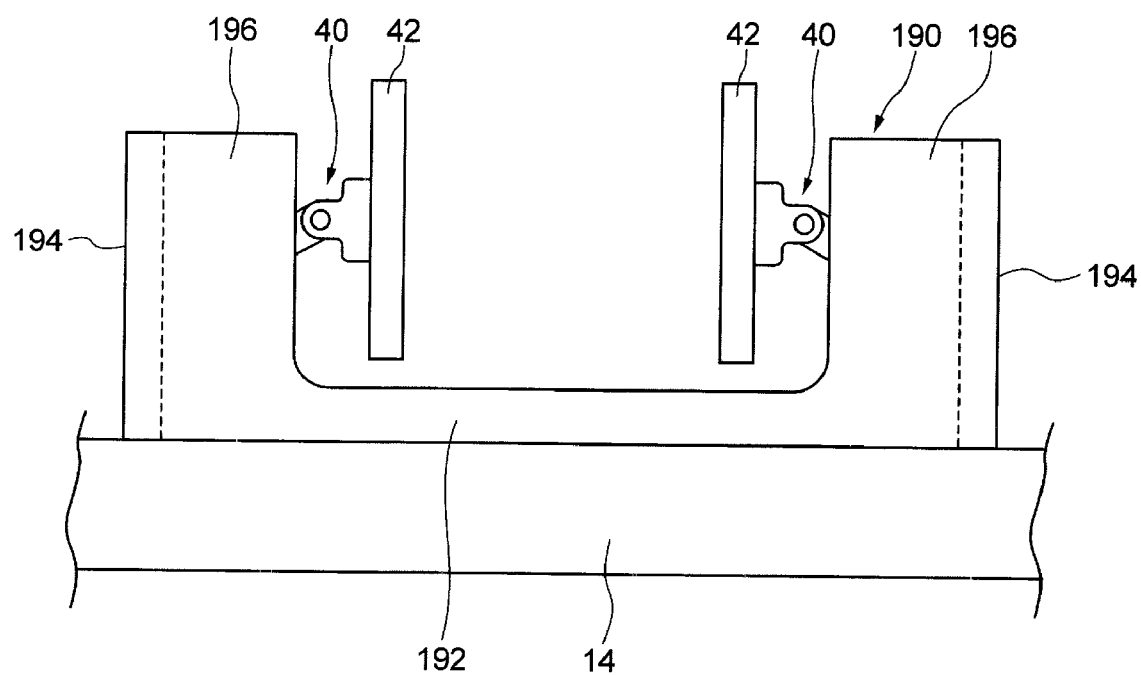
FIG. 12 is a front view of a C-shaped frame in which a blow cavity clamping device is disposed.
Figure 13:
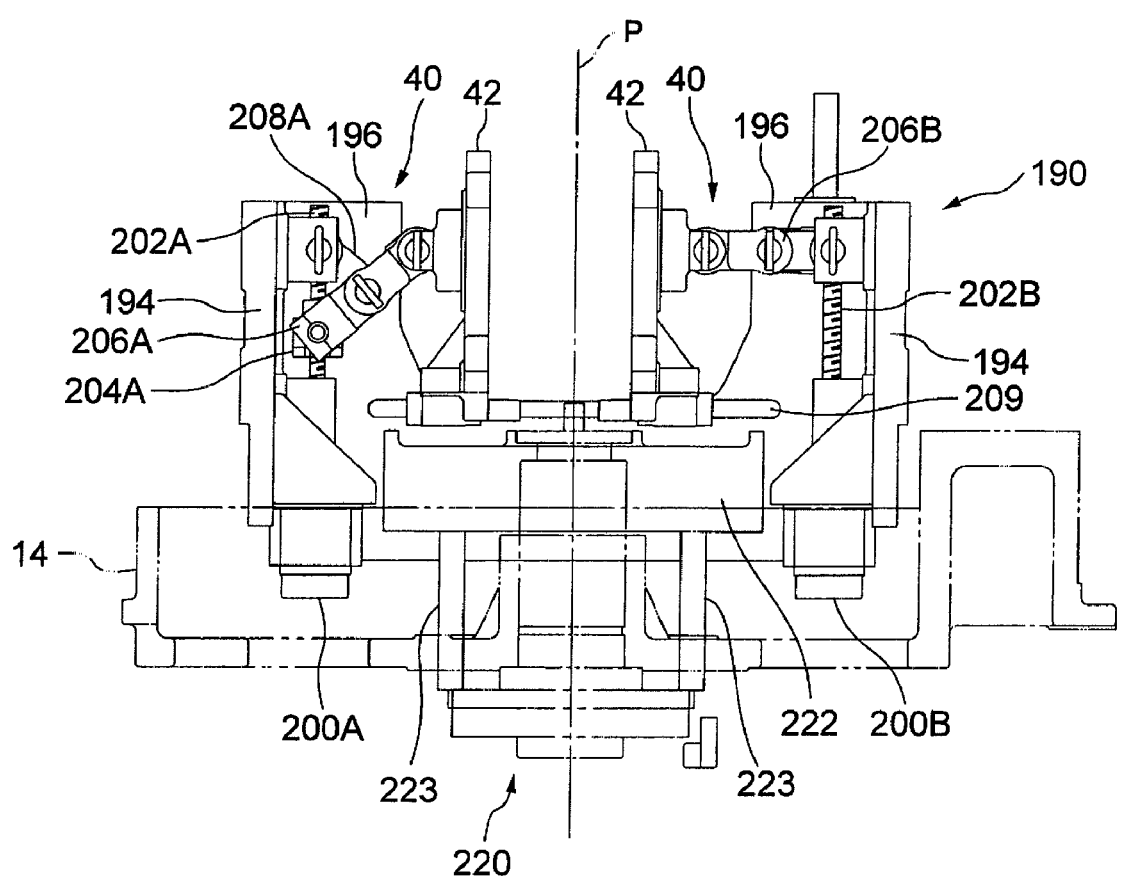
FIG. 13 is a front view of a blow cavity clamping device.

FIGS. 12 and 13 show a tie rod-less horizontal clamping mechanism of the stretch blow molding section 32.

FIG. 12 shows the horizontal clamping toggle mechanism 40 forming the horizontal tightening mechanism and a blow unit base 190 formed of a C-shaped frame provided with horizontal clamping motors 200A and 200B (see FIG. 13). The blow unit base 190 is formed by casting. The blow unit base 190 is integrally formed or integrated by bonding pieces separately formed. The blow unit base 190 formed of the C-shaped frame necessarily includes two base members 192 disposed horizontally along two opposite sides, and side members 194 disposed perpendicularly from either end of the two base members 192 in the longitudinal direction. Reinforcement wall members 196 obtained by causing the two base members 192 to extend to the upper ends of the two side members 194 may be formed on the front side and the rear side of the blow unit base 190.

The blow unit base 190 is employed to make it unnecessary to provide a horizontal tie rod which opens/closes and guides the clamping plates 42 on which two blow cavity split molds (symbols 294A and 294B in FIG. 16) are secured.

As shown in FIG. 13, the right and left toggle mechanisms 40 are attached to the side members 194 of the blow unit base 190, and open and close the clamping plate 42 with respect to the side members 194. Even when the two blow cavity split molds are clamped by the toggle mechanisms 40, the side members 194 which are integrated with the two base members 192 and optionally reinforced by the reinforcement wall members 196 are rarely deformed. Even if the upper ends of the side members 194 are deformed toward the outside from the centerline P of the blow cavity split molds, since the clamping plate 42 and the toggle mechanism 40 are rotatably pin-connected, as described later, the upper portion of the blow cavity split molds does not open so that the clamped state can be maintained. Moreover, since a horizontal tie rod between the two side members 192 is unnecessary, an obstacle does not exist during attachment/detachment of the blow cavity split molds or during maintenance. The two base members 192 may be optionally connected by a member other than the two side members 194.

As shown in FIG. 13, the two motors 200A and 200B are supported by the blow unit base 190. Screw shafts 202A and 202B are rotated by the two motors 200A and 200B.

The two toggle mechanisms 40 which are expanded and contracted by the two motors 200A and 200B are described below with reference to FIGS. 13 and 14. The two toggle mechanisms 40 are identical mechanisms disposed symmetrically. Therefore, the following description focuses on one of the toggle mechanisms 40.

Figure 14:
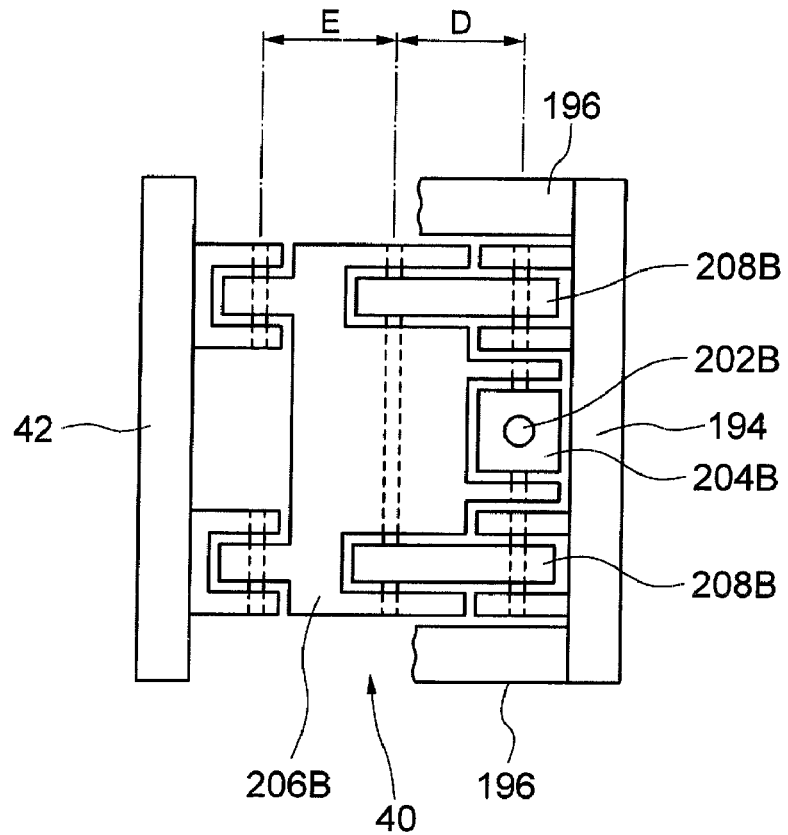
FIG. 14 is a plan view showing one of toggle mechanisms shown in FIG. 13.

FIG. 14 shows the right toggle mechanism 40 shown in FIG. 13. The toggle mechanism 40 includes a nut section 204B into which the screw shaft 202B is screwed, a driving arm 206B of which one end is pin-connected to the nut section 204B and the other end is pin-connected to the clamping plate 42, and a driven arm 208B (two driven arms in this embodiment) of which one end is pin-connected to the side member 194 and the other end is pin-connected to the driving arm 206B. The pin-to-pin distance (D+E) of the driving arm 206B is twice the pin-to-pin distance D of the driven arm 208B (i.e., D=E).

A clamped state in which the nut section 204B is raised by the motor 200B so that the driving arm 206B extends horizontally is shown on the right in FIG. 13. A mold open state in which the nut section 204A is lowered by the motor 200A is shown on the left in FIG. 13. The two clamping plates 42 opened and closed by the two toggle mechanisms 40 have guide holes (not shown) into which two guide shafts 209 (only one guide shaft is shown in FIG. 13) are inserted at the lower end, and are opened and closed horizontally while being guided along the guide shafts 209. Since the guide shafts 209 are disposed at the lower ends of the two clamping plates 42, the guide shafts 209 do not interfere with the blow cavity split molds during maintenance or attachment/detachment of the blow cavity split molds. Note that the guide shaft 209 is not indispensable. It suffices to dispose a horizontal guide device which ensures that the two clamping plates 42 are opened and closed horizontally at the lower end.

The driving force of the nut sections 204A and 204B can be reduced as compared with the connection structure of the toggle mechanisms 84 and 90 shown in FIGS. 4 and 7 by setting the distance D to be equal to the distance E, whereby the load of the motors 200A and 200B can be reduced.

(Blow Unit Position Adjustment Mechanism)

Figure 15:
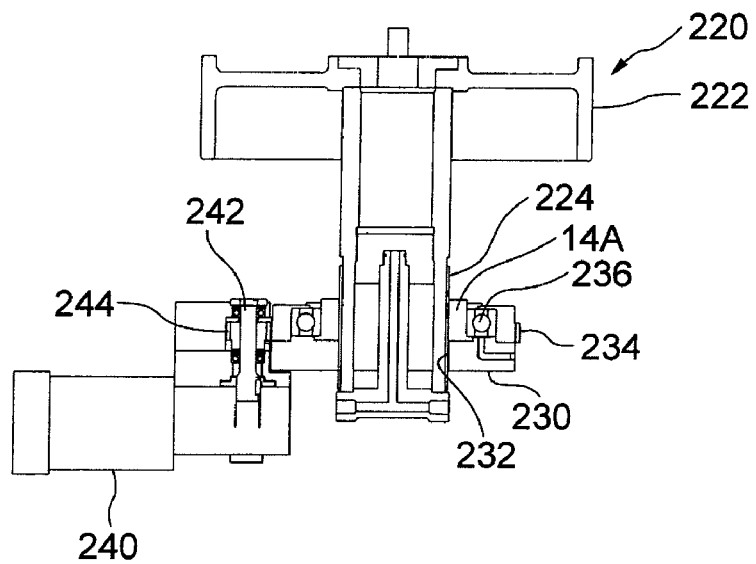
FIG. 15 is a view showing a blow unit position adjustment mechanism.

The blow unit base 190 and a blow bottom mold securing plate 222 shown in FIG. 13 are connected and are integrally raised and lowered while four guide shafts 223 (only two guide shafts are shown in FIG. 13) suspended from the blow bottom mold securing plate 22 are guided through guide holes (not shown) in the lower base 14. As shown in FIG. 15, a blow unit position adjustment mechanism 220 is provided which adjusts the vertical position of the blow unit base 190. A threaded portion (third threaded portion) 224 is formed at the lower end of a shaft section suspended from the blow bottom mold securing plate 22 secured on the blow unit base 190 on the centerline P (see FIG. 13) of the two blow cavity split molds. A nut section (third nut section) 232 into which the threaded portion 224 is screwed and a large-diameter gear (seventh gear) 230 having a gear section 234 in the peripheral portion are rotatably supported by a securing member 14A secured on the lower base 14 through a bearing 236. A motor (fifth motor in a broad sense) 240 is provided on the lower base 14, and a small-diameter gear (sixth gear) 244 secured on a vertical rotation shaft 242 rotated by the motor 240 engages with the gear section 234 provided on the rotor 230.

According to the blow unit position adjustment mechanism 220, the rotor 230 is rotated by the rotational force of the motor 240. The rotor 230 is rotatably supported by the lower base 14, and the nut section 232 of the rotor 230 engages with the screw shaft 224 provided on the blow bottom mold securing plate 22. Therefore, the screw shaft 224 is raised and lowered with respect to the lower base 14 by the rotation of the nut section 232 together with the blow unit base 190. Therefore, the large-diameter gear 230 which supports the nut section 232 forms a position change section (third position change section) which changes a support height position (third support height position) at which the blow unit base 190 is supported by the lower base 14.

This makes it possible to raise the blow unit base 190 when the container to be molded is small and lower the blow unit base 190 when the container to be molded is large. Therefore, the distance B (height) of the molding space can be adjusted by the mold thickness adjustment mechanism 170, and the distance C (see FIG. 1) between the reference position of the lower base 14 and the reference position of the blow unit base 190 (e.g. the reference position of the blow bottom mold securing plate 22) can be adjusted by the blow unit position adjustment mechanism 220. Specifically, the height of the blow molding space defined by the blow unit base 190 and the upper base 16 can be changed independently of the height of the molding space between the lower base 14 and the upper base 16. Therefore, the height of the blow cavity split molds can be designed independently of the injection mold, whereby the degrees of freedom of the design are increased. Accordingly, the dimensions of the blow bottom mold and the blow cavity split mold need not be unnecessarily increased, whereby the weight of the blow mold can be reduced.

The blow unit base 190 has the screw shaft 224 on the centerline P of the two blow cavity split molds, i.e., at the center of gravity of the moving weight which moves together with the blow unit base 190. This enables the screw shaft 224 and the blow unit base 190 to be integrally raised and lowered by rotating the nut section 232 by the output from the motor 240 while achieving stability without using the toggle mechanism and minimizing the load of the motor 240.

Moreover, the rotating torque can be increased by rotating the large-diameter gear 230 through the small-diameter gear 244, and space can be saved by forming the nut section 232 inside the large-diameter gear 230.

In addition, the blow unit base 190 can be stably raised and lowered by driving the screw shaft 224 utilizing the guide shafts 223 provided at the peripheral positions of the blow unit base 190 at an equal distance from the screw shaft 224 provided at the center position.

(Gravity Counterbalance Device)

Figure 16:
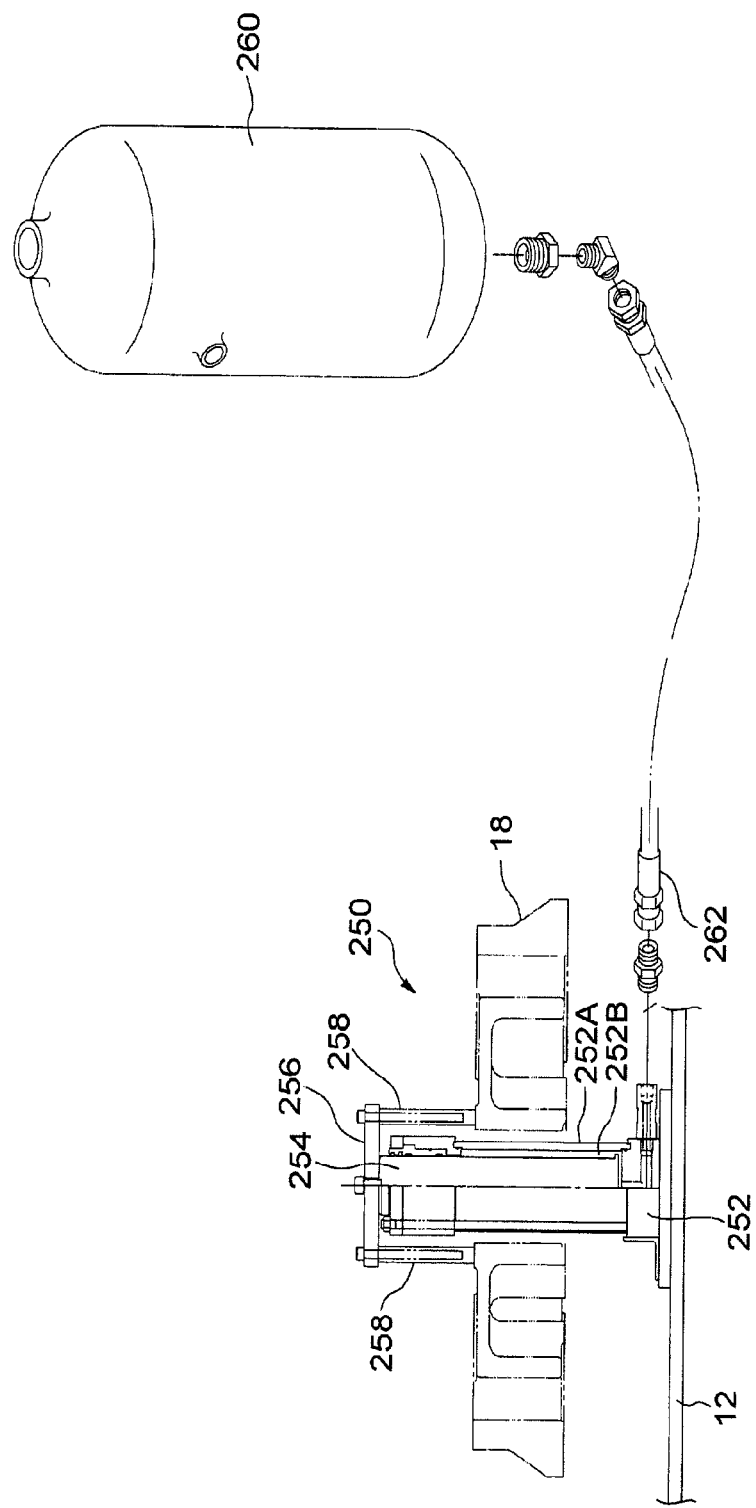
FIG. 16 is a schematic view of a vertical clamping gravity counterbalance device.

A gravity counterbalance device 250 shown in FIG. 16 is provided in order to control vertical clamping against the inertial force of the moving weight including the movable upper base 16 while employing the motor 90 and the toggle mechanism 92 as the vertical clamping mechanism without using a mechanical spring and a cylinder. The gravity counterbalance device 250 includes an air cylinder 252 secured on the bottom surface of the stage 12. A cylinder rod 254 is slidably held in a cylindrical member 252A of the air cylinder 252, and compressed air from a reservoir tank 260 (high-pressure air tank in a broad sense) is supplied to an air chamber 252B between the cylindrical member 252A and the cylinder rod 254 through a pipe 262. It suffices that the reservoir tank 260 be a high-pressure air tank. For example, a high-pressure air tank for supplying high-pressure air to the injection stretch blow molding apparatus may also be used as the reservoir tank 260. In this embodiment, a blow air tank which supplies blow air to the stretch blow molding section 32 is also used as the reservoir tank 260.

The cylinder rod 254 is connected to the pulling plate 18 through a connection plate 256 and connection rods 258 suspended from the connection plate 256. This structure allows the cylinder rod 256 to be connected to the pulling plate 18 at a position corresponding to the center of rotation of the turntable 26 supported by the upper base 16, i.e., at a position almost opposite to the center-of-gravity position of the moving weight which moves together with the upper base 16. Therefore, it suffices to dispose only one air cylinder 252. When the center-of-gravity position of the moving weight which moves together with the upper base 16 is significantly displaced from the center of rotation of the turntable 26 (e.g. shifted toward the injection molding section 30), the cylinder rod 256 may be connected to the pulling plate 18 at the center-of-gravity position. When securing the pulling plate 18 above the cylinder rod 256, the total height of the apparatus increases by the height of the air cylinder 252. According to the connection structure shown in FIG. 16, the effects of the height of the cylinder 252 on the total height of the apparatus can be reduced.

The pulling plate 18 is lowered by the vertical clamping devices 90 and 92 to lower the upper base 16, and the upper base 16 is set at the lower limit position when the output of the motor 92 is terminated to perform vertical clamping. Even if the motor 92 is stopped, the moving weight which moves together with the pulling plate 18 and the upper base 16 further lowers due to the inertial force, differing from hydraulic driving, and the moving weight cannot be supported by only the motor 92 and the toggle mechanism 90.

In this embodiment, the moving weight including the upper base 16 is counterbalanced with the output of the air cylinder 250 to which high-pressure air is supplied from the reservoir tank 260, whereby the upper base 16 is stopped at the stop position of the motor 92. In this case, since the capacity of the reservoir tank 260 is as large as 25 liters when using the blow air tank as the reservoir tank 260, for example, a change in air pressure in the tank during the gravity counterbalance operation can be disregarded. Moreover, since air need not be discharged to the outside during the gravity counterbalance operation, no running cost is required. Since high-pressure air is indispensable for blow molding and driving in the injection stretch blow molding apparatus, the reservoir tank can be effectively utilized by using the air tank for supplying air to the injection stretch blow molding apparatus as the reservoir tank.

It suffices that the air cylinder 252 be disposed between the movable section formed of the upper base 16 and the pulling plate 18 or the stationary section formed of the stage 12 and the lower base 14. The air cylinder 252 does not necessarily need to be disposed between the bottom surface of the stage 12 and the pulling plate 18, differing from FIG. 16. The air cylinder 252 may be provided between the upper base 16 and the lower base 14, between the upper base 16 and the stage 12, or between the pulling plate 16 and the lower base 14. Note that it is difficult to dispose the air cylinder 252 at the center-of-gravity position of the moving weight including the upper base 16 (i.e., the center of rotation of the turntable 26) due to the limited space in cases other than the case shown in FIG. 16. Therefore, two or more air cylinders 252 are required when disposing the air cylinder while avoiding the center-of-gravity position.

Figure 17:
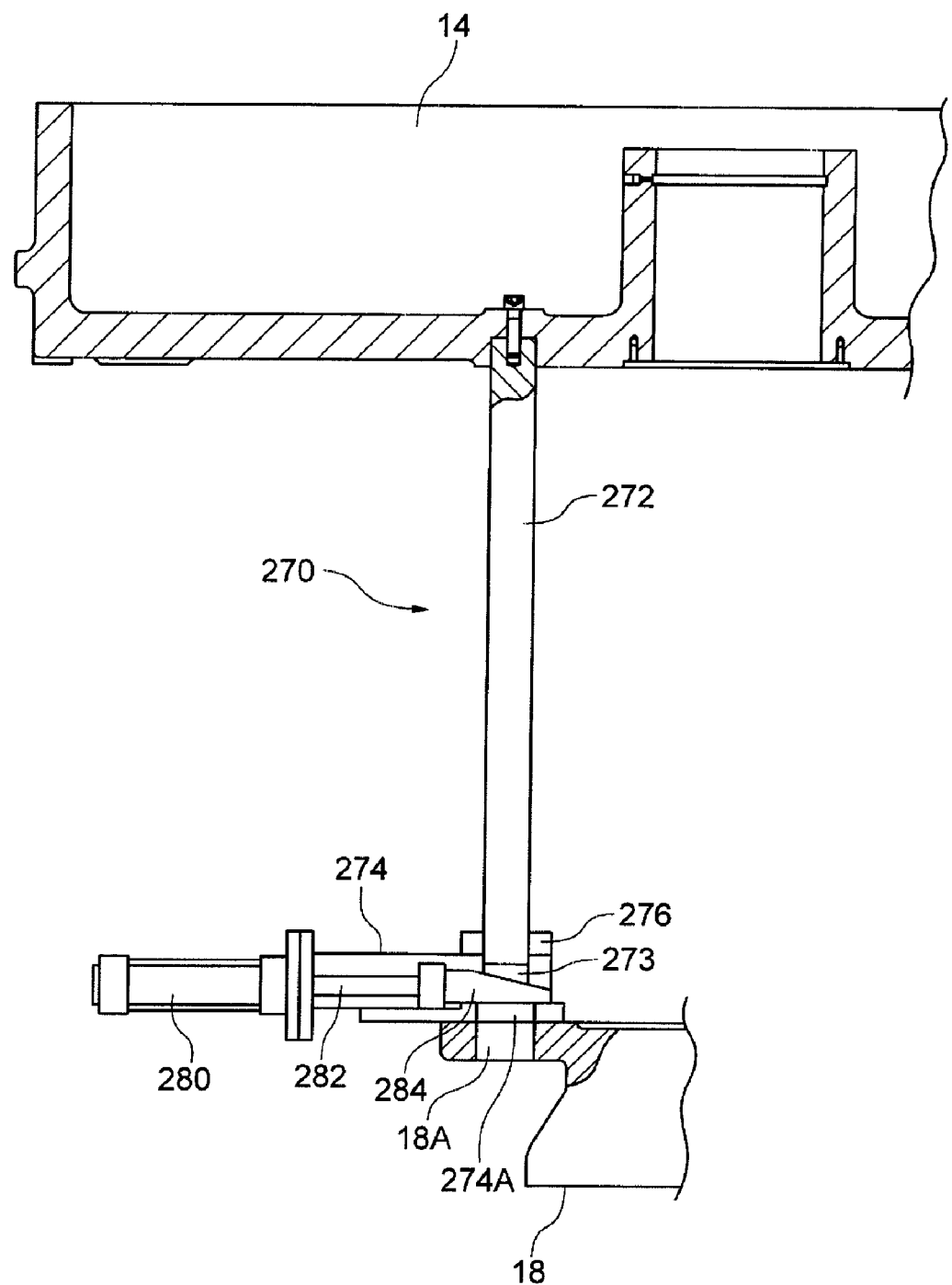
FIG. 17 is a schematic view showing a height position restriction device of an upper base during vertical clamping.
Figure 18:
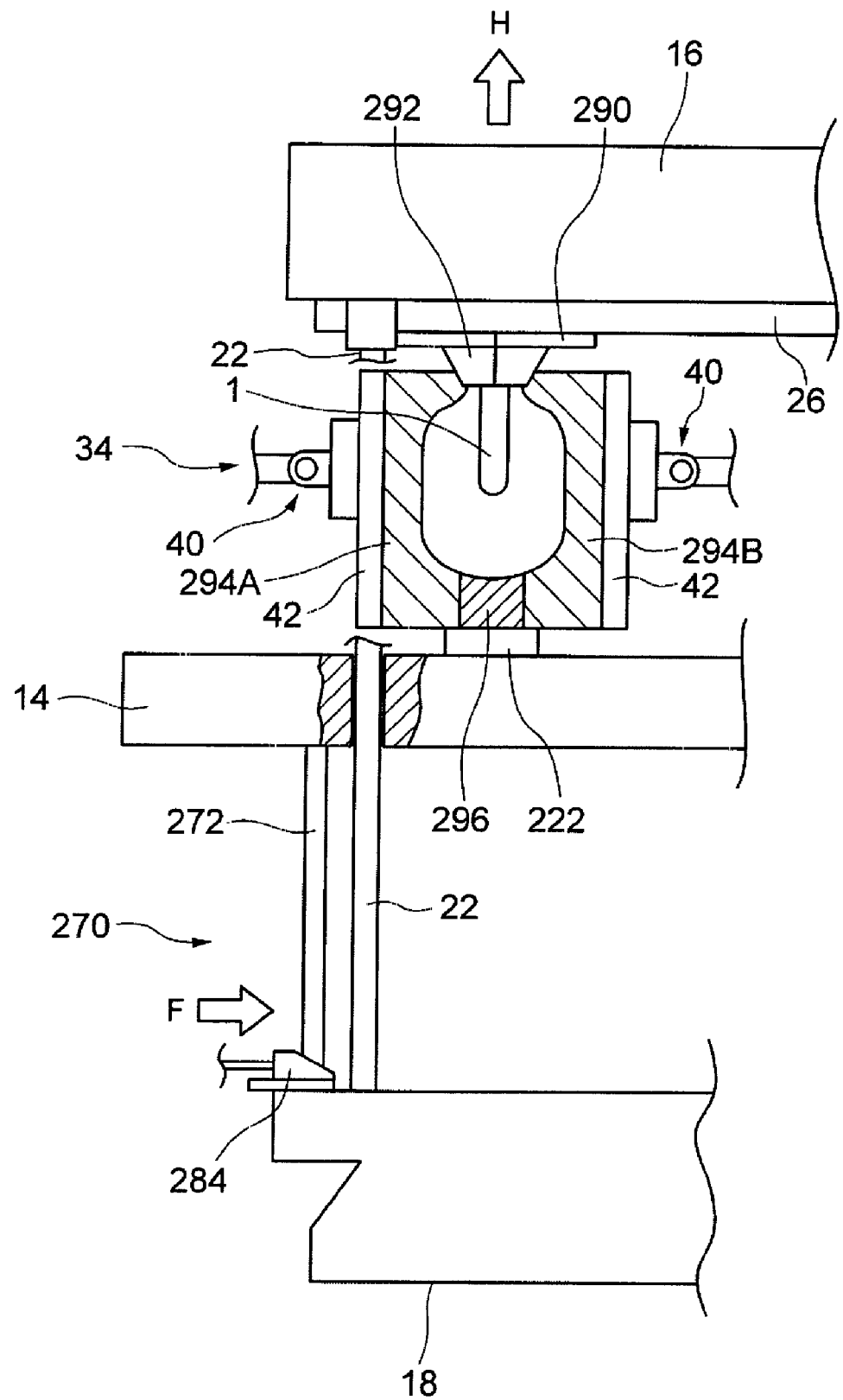
FIG. 18 is a schematic view illustrative of the restriction operation of the restriction device shown in FIG. 17.

FIGS. 17 and 18 show an upper base height position restriction device 270 on the side of the stretch blow molding section during vertical clamping. As described above, the pulling plate 18 is connected to the four tie rods 22, and the vertical clamping devices 90 and 92 are disposed between the two tie rods 22 on the side of the injection molding section 30 and are driven at a position displaced from the center of the pulling plate 18. The pulling plate 18 is maintained horizontally against eccentric driving by providing the horizontal synchronization mechanism 160. However, since the stretch blow molding section 32 is not vertically clamped directly, the upper base 18 may rise in a direction H shown in FIG. 18 due to the reaction force of eccentric driving, the blow air pressure, and the like.

As shown in FIGS. 17 and 18, a shaft section 272 suspended from the lower base 14 (or stage 12) and a driving section such as an air cylinder 280 which inserts and removes a wedge-shaped member 284 inserted into the lower end of the shaft section 272 after vertical clamping are provided. The wedge-shaped member 284 is secured on a cylinder rod 282 of the air cylinder 280. A tip member 273 having a downwardly tapered surface along the upper surface of the wedge-shaped member 284 is formed at the lower end of the shaft section 272. The air cylinder 280 is secured on the pulling plate 18 through a mounting member 274, and the pulling plate 18 is provided with a guide member 276 into which the shaft section 270 is inserted during vertical clamping. A hole 274A and a hole 18A are respectively formed in the mounting member 274 and the pulling member 18 opposite to the hole in the guide member 276.

FIG. 18 shows a state in which the blow core mold is prevented from rising during vertical clamping using the shaft section 270 and the air cylinder 280. FIG. 18 shows a vertically clamped state in which the upper base 16 and the pulling plate 18 are lowered by the vertical clamping devices 90 and 92 not shown. In FIG. 18, a preform 1 is set at a blow position by a neck mold 292 supported by a neck mold support plate 290 supported by the upper base 16. Blow cavity split molds 294A and 294B are horizontally clamped by the toggle mechanisms 40 and 40 with respect to the neck mold 292 and a blow bottom mold 296. The air cylinder 280 is driven before commencement of a blow molding operation (driving the stretch rod and introducing blow air), and the wedge-shaped member 284 is driven forward. This causes the wedge-shaped member 284 to enter the space under the lower-end tip member 273 of the shaft section 270, as shown in FIG. 18. This restricts the distance between the lower base 14 and the pulling plate 18 in the stretch blow molding section 32, whereby the pulling plate 18 does not move upward from the position shown in FIG. 18. When the movement of the pulling plate 18 is restricted, the movement of the upper base 18 connected to the pulling plate 18 through the four tie rods is also restricted. Therefore, the clamped state of the neck mold 292 and the blow core mold can be maintained.

When the blow molding operation is completed, the air cylinder 280 is driven so that the wedge-shaped member 284 is withdrawn to the position away from the lower-end tip member 273 of the shaft section 270. The blow cavity split molds 294A and 294B are then opened, and the pulling plate 18 is raised together with the upper base 16 to vertically open the mold. In this case, since the shaft section 270 passes through the two holes 274A and 18A shown in FIG. 17, the shaft section 270 does not interfere with the pulling plate 18.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

For example, the above embodiment has been described taking an example in which four molding sections including the injection molding section 30, the temperature control section 34, the stretch blow molding section 32, and the removal section 36 are provided, and molded products are transferred by intermittently rotating the turntable by 90 degrees. Note that the invention is not limited to this example. It suffices that the molding sections include at least the injection molding section and the stretch blow molding section. The temperature control section 34 may be omitted and/or the molded product may be removed by the stretch blow molding section 32 (two or three molding sections may be provided). In this case, the turntable 26 may be intermittently rotated by 180 degrees or 120 degrees depending on the number of molding sections.

What is claimed is:

1. An injection stretch blow molding apparatus which includes at least an injection molding section and a stretch blow molding section and includes a turntable which intermittently transfers neck molds disposed corresponding to the respective molding sections to the respective molding sections, the injection stretch blow molding apparatus comprising:

a lower base which is secured on a stage and forms a molding space of each of the molding sections between the lower base and the turntable;
an upper base which is disposed above the lower base and supports the turntable; and
vertical clamping device that raises and lowers the upper base with respect to the lower base;
wherein the vertical clamping device includes:
a pulling plate disposed in the stage under the lower base;
a plurality of tie rods which pass through the lower base and connect the upper base with the pulling plate;
a vertical clamping toggle mechanism which is disposed in the stage at a position under the injection molding section and is expanded and contracted with respect to the lower base as a reference position to raise and lower the pulling plate; and
a first motor which transmits a driving force to the vertical clamping toggle mechanism;
wherein, when one of the upper base and the pulling plate is a movable section and one of the lower base and the stage is a stationary section, the stretch blow molding section is provided with a restriction device that restricts the upper base from rising above the stretch blow molding section by maintaining a constant distance between the movable section and the stationary section when clamped by the vertical clamping device.

2. The injection stretch blow molding apparatus as defined in claim 1,
wherein the restriction device includes:
a shaft section suspended from the stationary section;
a wedge-shaped member which is inserted into and removed from a space between the lower end of the shaft section and the pulling plate; and
a driving section which drives the wedge-shaped member.

3. The injection stretch blow molding apparatus as defined in claim 1,
wherein horizontal synchronization device that horizontally moves the pulling plate is disposed in the stage; and
wherein the horizontal synchronization device includes:
a plurality of racks suspended from the lower base on the injection molding section side and the stretch blow molding section side; and
a plurality of pinions which are supported by a shaft disposed over the pulling plate between the injection molding section and the stretch blow molding section and respectively engage with the racks.

4. The injection stretch blow molding apparatus as defined in claim 1, wherein a motor securing plate to which a second motor which clamps an injection core mold is attached is disposed above the upper base;

wherein an injection core clamping toggle mechanism is provided which is expanded and contracted by the second motor with respect to the motor securing plate as a reference position to clamp the injection core mold; and wherein the motor securing plate, the upper base, and the pulling plate is adapted to be raised and lowered together with the tie rods.

5. The injection stretch blow molding apparatus as defined in claim 4, further comprising an injection core clamping position adjustment mechanism which adjusts a clamping position of the injection core mold by adjusting a height position of the motor securing plate with respect to the upper base.

6. The injection stretch blow molding apparatus as defined in claim 5, wherein the upper ends of two of the tie rods disposed in the injection molding section are supported by the motor securing plate, and two first threaded portions are formed at the upper ends of the two tie rods;

wherein the injection core clamping position adjustment mechanism includes:

a third motor which is supported by the motor securing plate and generates a rotation output from each end of a horizontal rotary shaft;

two bevel gearboxes which orthogonally transform the rotation output from each end of the horizontal rotary shaft; and a first position change section which changes a first support height position at which the motor securing plate is supported by the two tie rods; and wherein the first position change section includes:

two first nut sections which are rotatably supported by the motor securing plate and into which the two first threaded portions are screwed; and two second gears which are respectively secured on the two first nut sections and to which rotational forces of two first gears are transmitted.

7. The injection stretch blow molding apparatus as defined in claim 1, further comprising a mold thickness adjustment mechanism which changes the height of the molding space between the lower base and the upper base to correspond to the thickness of a mold disposed in the molding space.

8. The injection stretch blow molding apparatus as defined in claim 7, wherein the mold thickness adjustment mechanism includes:

a fourth motor;

a third gear rotated by the fourth motor;

a large-diameter fourth gear which can be rotated around a position at an equal distance from the tie rods as a center of rotation and engages with the third gear;

a plurality of second threaded portions respectively formed at lower ends of the tie rods; and a second position change section which changes a second support height position at which the pulling plate is supported by the tie rods; and wherein the second position change section includes:

a plurality of second nut sections which are rotatably supported by the pulling plate and respectively engage the second threaded portions; and a plurality of fifth gears which are respectively secured on the second nut sections and to which a rotational force of the fourth gear is transmitted.

9. The injection stretch blow molding apparatus as defined in claim 1, further comprising:

a blow unit base which is disposed in the stretch blow molding section, which is raised and lowered with respect to the lower base, and on which horizontal clamping device for two blow cavity split molds clamped against the neck mold is provided; and a blow unit position adjustment mechanism which raises and lowers the blow unit base to adjust a height position.

10. The injection stretch blow molding apparatus as defined in claim 9, wherein the blow unit position adjustment mechanism includes:

a fifth motor supported by the lower base;

a sixth gear rotated by the fifth motor;

a third threaded portion which is connected to the blow unit base and is disposed on a centerline of the two blow cavity split molds; and a third position change section which changes a third support height position at which the blow unit base is supported by the lower base; and wherein the third position change section includes:

a third nut section which is rotatably supported by the lower base and engages with the third threaded portion; and a seventh gear which secured on the third nut section and to which a rotation output of the sixth gear is transmitted.

* * * * *